(12) United States Patent
Gandhi

(10) Patent No.: US 9,527,250 B2
(45) Date of Patent: Dec. 27, 2016

(54) METHODS, APPARATUS AND SYSTEMS FOR REDUCING WARPAGE IN POLYMERS WITH CONTINUOUS FIBERS

(75) Inventor: Umesh N. Gandhi, Farmington Hills, MI (US)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 549 days.

(21) Appl. No.: 13/330,444

(22) Filed: Dec. 19, 2011

(65) Prior Publication Data

US 2013/0153121 A1 Jun. 20, 2013

(51) Int. Cl.

| | |
|---|---|
| *B32B 37/08* | (2006.01) |
| *B32B 38/18* | (2006.01) |
| *B32B 7/02* | (2006.01) |
| *B32B 37/06* | (2006.01) |
| *B29C 70/56* | (2006.01) |
| *B32B 37/00* | (2006.01) |
| *B32B 27/12* | (2006.01) |

(52) U.S. Cl.
CPC .............. *B29C 70/56* (2013.01); *B32B 27/12* (2013.01); *B32B 37/0015* (2013.01); *B32B 2262/101* (2013.01); *B32B 2305/08* (2013.01); *B32B 2305/10* (2013.01); *Y10T 428/24942* (2015.01)

(58) Field of Classification Search
CPC .............. B29C 70/56; B32B 2262/101; B32B 2305/08; B32B 2305/10; B32B 27/12
USPC ........................................................ 156/242
See application file for complete search history.

(56) References Cited

U.S. PATENT DOCUMENTS

| | | | |
|---|---|---|---|
| 3,641,230 A | 2/1972 | Jenks | |
| 3,882,078 A | 5/1975 | Kubota | |
| 4,078,348 A | 3/1978 | Rothman | |
| 4,511,700 A * | 4/1985 | Melby et al. | 525/283 |
| 4,652,409 A * | 3/1987 | Leese et al. | 264/448 |
| 4,705,716 A | 11/1987 | Tang | |
| 4,857,379 A | 8/1989 | Plontges et al. | |
| 4,868,038 A | 9/1989 | McCullough, Jr. et al. | |
| 5,037,691 A | 8/1991 | Medney et al. | |
| 5,087,000 A * | 2/1992 | Suto | 244/189 |
| 5,534,590 A * | 7/1996 | Horiie | 525/71 |

(Continued)

FOREIGN PATENT DOCUMENTS

| | | | |
|---|---|---|---|
| CN | 1760489 A * | 4/2006 | |
| CN | 101338078 A * | 1/2009 | |

(Continued)

OTHER PUBLICATIONS

Bartenev, G. et al.; "Effect of Tensile Stresses on the Strength of Heat-Treated Glass fibers"; Mekhanika Polimerov, Vo. 1, No. 1, pp. 89-92, 1965.

(Continued)

*Primary Examiner* — Philip Tucker
*Assistant Examiner* — Vicki Wu
(74) *Attorney, Agent, or Firm* — Snell & Wilmer LLP

(57) ABSTRACT

Apparatus, systems and/or methods are provided to substantially reduce warping of a reinforced polymer. For example, by pre-stressing a glass component proportional to the difference between coefficients of linear expansions of glass and polymers, warping may be reduced when the resulting glass-polymer compound is cooled.

10 Claims, 4 Drawing Sheets

(56) References Cited

U.S. PATENT DOCUMENTS

| | | | |
|---|---|---|---|
| 5,759,924 A * | 6/1998 | Sahlin | D06N 3/04 156/308.2 |
| D419,614 S * | 1/2000 | Mooradian | D21/452 |
| 6,105,395 A | 8/2000 | Yoshida et al. | |
| 6,174,595 B1 | 1/2001 | Sanders | |
| 6,369,157 B1 * | 4/2002 | Winckler et al. | 524/783 |
| 7,232,605 B2 | 6/2007 | Burgueno et al. | |
| 2003/0073368 A1 | 4/2003 | Berkhoff et al. | |
| 2004/0040641 A1 * | 3/2004 | Blackmon et al. | C03B 23/0357 156/85 |
| 2005/0013982 A1 * | 1/2005 | Burgueno et al. | 428/292.1 |
| 2006/0060592 A1 * | 3/2006 | Kamite | B29C 47/003 220/737 |
| 2008/0139698 A1 * | 6/2008 | Nishida et al. | 523/205 |
| 2011/0101734 A1 | 5/2011 | Gunther et al. | |

FOREIGN PATENT DOCUMENTS

| | | | |
|---|---|---|---|
| JP | 11198264 A * | 7/1999 | |
| JP | 2001105505 A * | 4/2001 | |
| JP | 2001-105505 | 4/2011 | |

OTHER PUBLICATIONS

Zhao, Jianhong et al.; "Polypropylene Matrix Composites Reinforced With Pre-Stressed Glass Fibers"; Polymer Composites; vol. 19, No. 3; pp. 218-224, Jun. 1998.

* cited by examiner

METHODS, APPARATUS AND SYSTEMS FOR REDUCING WARPAGE IN POLYMERS WITH CONTINUOUS FIBERS

BACKGROUND

1. Field

The present invention includes methods, apparatus and systems related to the reduction of undesired warping in polymers with continuous fibers. For example, the present invention improves the quality of polymers strengthened with glass fibers also known as fiber-reinforced-polymers (FRP) composites.

2. Description of the Related Art

Polymers used in any of a number of different manufacturing fields, including automobile manufacturing, may benefit from increased strength and stiffness. FRP composites may have benefits based on selection and usage. And as the materials used to produce the FRP composites are customizable selected, a wide variety of benefits may be achieved, including, being light weight, having high strength-to-weight ratio, directional strength, corrosion resistance, weather resistance, dimensional stability, low thermal conductivity, low coefficient of thermal expansion, radar transparency, non-magnetic, high impact strength, high dielectric strength (insulator), low maintenance, high durability, part consolidation, small-to-large part geometry possibilities and tailored surface finishes.

For example, in the field of automotive manufacturing, stronger polymers or FRPs may provide for a more effective bumper, a longer lasting body panels, sturdier wind-shield wipers, and the like. Indeed, the desire for stronger and/or stiffer polymers is well recognized.

As is currently practiced, two main techniques are employed to generate stronger polymers. The first technique is to add continuous fiber tapes to a heated polymer prior to molding and cooling to result in a FRP composite. However, without more, the resulting FRP composite may be warped, and therefore is not ideal for the fitting of the molded polymer into other parts (when the molded polymer is a component of a larger system), or for products where a flat and strong FRP composite is desirable.

FIG. 1A illustrates a conventional, prior art polymer having a layer of glass fiber tape for strengthening the polymer in a heated stage. While heated, the layer of polymer and the layer of glass fiber of the FRP composite may appear to be substantially flat. However, as the FRP composite cools down, warping begins to take place, as the polymer is unable to cause the glass to shrink to the same size as the polymer. This causes the undesired warping of the FRP composite. The result, as shown in FIG. 1B, is that the polymer layer contracts more than the glass layer, causing significant warping to the FRP composite.

More particularly, the warping results because the coefficient of linear expansion (a) for glass is significantly lower compared to the polymer. For example, $$\alpha_G = 5 \times 10^{-6} \text{ mm/mm·c}$$

whereas a polymer may have a CLTE of approximately, $$\alpha_P = 1 \times 10^{-4} \text{ mm/mm·c}.$$

One known way of reducing warping is to lay continuous fiber tapes in varying orientations (e.g., 0°, 45° or 90°) within the polymer. However, this approach is very expensive, inconsistent and requires a trial-and-error process.

Alternatively, strengthening a polymer may be done by adding chopped fibers into a melted polymer, thereby mixing the fiber into the polymer and injecting the resulting mixture into a mold.

However, using chopped fibers (e.g., fibers chopped down to 2 mm-5 mm pieces) for increasing the strength of a polymer is not ideal, and suffers from various drawbacks, including a resulting FRP composite that is not as strong.

Therefore, what is needed is a method, apparatus and/or system which accounts for the difference in the coefficient of linear expansion of glass and polymers, such that when glass is added to a polymer, the resulting product does not suffer the effects of significant warping, and provides a resulting polymer that is much stronger.

SUMMARY

Apparatus, systems and/or methods directed to addressing the issue of warping are described herein. More particularly, one or more embodiments described herein may limit the effects of warping when glass or any other continuous fiber product geared towards strengthening an added polymer, thereby providing improved performance of the resulting FRP composite. For example, by pre-stressing a glass component proportional to the difference between coefficients of linear expansions of glass and polymers, warping may be reduced when the resulting FRP composite is cooled.

In one embodiment, provided is a fiber reinforced polymer composite apparatus comprising a layer of polymer having a first coefficient of linear expansion, and a layer of continuous fiber tape molded to one side of the layer of the polymer such that after cooling, the layer of polymer and the layer of continuous fiber remain substantially flat. The layer of continuous fiber having a second coefficient of linear expansion different than the first coefficient of linear expansion of the layer of polymer.

In one embodiment, provided is a method for reducing the warping of a molded polymer-continuous fiber compound, the method comprising pre-stressing a layer of continuous fiber, molding the layer of continuous fiber to a layer of polymer including a heating process, and cooling the layer of continuous fiber and the layer of polymer such that the resulting compound is substantially flat.

In another embodiment, provided is a method of reducing the warping of a molded glass-reinforced polymer. The method comprising pre-stressing a continuous glass fiber tape by stretching and holding the continuous glass fiber tape horizontally and/or vertically by means of a device, adding a heated polymer to the pre-stressed continuous glass fiber tape to form a fiber-reinforced-polymer (FRP) composite, molding the FRP composite, cooling the FRP composite, and releasing the continuous glass fiber tape from the pre-stress applied causing the FPR composite to be substantially unwarped.

BRIEF DESCRIPTION OF THE DRAWINGS

The features, obstacles, and advantages of the present invention will become more apparent from the detailed description set forth below when taken in conjunction with the drawings, wherein.

DETAILED DESCRIPTION

Apparatus, systems and/or methods that implement the embodiments of the various features of the present invention will now be described with reference to the drawings. The drawings and the associated descriptions are provided to illustrate some embodiments of the present invention and not to limit the scope of the present invention. Throughout the drawings, reference numbers are re-used to indicate correspondence between referenced elements.

The present invention relates to apparatus, systems or methods directed to reducing warping in a resulting FRP composite when including a continuous fiber layer or tape in a polymer.

Figure 1A:
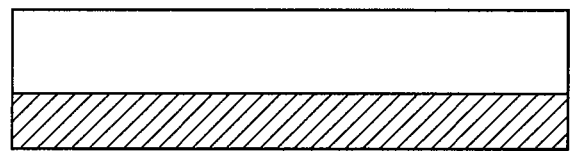
FIG. 1A illustrates a prior art polymer having a layer of glass fiber for strengthening the polymer in a heated stage.
Figure 1B:
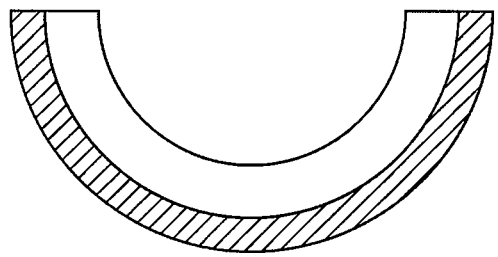
FIG. 1B illustrates a prior art polymer of FIG. 1A suffering the effects of warping when cooled.
Figure 2A:
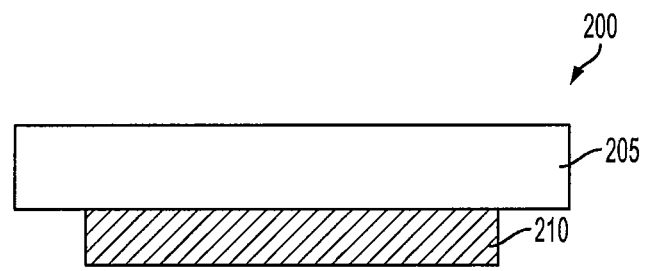
FIG. 2A illustrates a side, cross-sectional view of a polymer layer and a continuous fiber tape prior to pre-stressing the continuous fiber tape in accordance with an embodiment of the present invention.

FIG. 2A illustrates a polymer 205 and a continuous fiber tape 210. The function of the continuous fiber tape 210 is to bind to and strengthen the polymer 205 in a resulting FRP composite. In practice, the polymer 205 may be heated to or beyond a melting point and then molded to the continuous fiber tape 210. For clarity, the polymer 205 is shown to be laid upon the continuous fiber tape 210. However, one of ordinary skill in the art will know that in practice, the polymer 205 may be heated and molded to the continuous fiber tape 210 to result in a stronger and/or stiffer FRP composite 200.

Figure 2B:
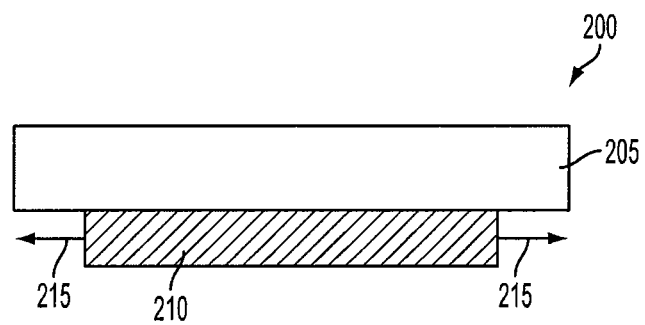
FIG. 2B illustrates a side, cross-sectional view of the polymer layer and the continuous fiber tape of FIG. 2A with the continuous fiber layer undergoing pre-stressing in accordance with an embodiment of the present invention.

FIG. 2B illustrates a pre-stress being added to the continuous fiber tape 210 to stretch the continuous fiber tape 210 in the direction of arrows 215. Pre-stressing the continuous fiber tape 210 may include stretching it and holding it in place by way of a clamp or other mechanical device.

Figure 2C:
FIG. 2C illustrates a side, cross-sectional view of the polymer layer and the pre-stressed continuous fiber tape of FIG. 2B in accordance with an embodiment of the present invention.
Figure 2D:
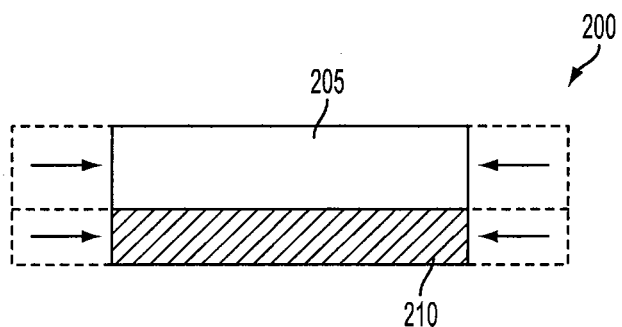
FIG. 2D illustrates a side, cross-sectional view of the polymer layer and the continuous fiber tape of FIG. 2C after removal of the stress and cooling in accordance with an embodiment of the present invention.

FIG. 2C illustrates the continuous fiber tape 210 in a pre-stressed state and substantially expanded beyond its normal dimensions. The pre-stress amount applied to the continuous fiber tape 210 may be matched to ensure that the amount of shrinking due to the cooling of the polymer matches the amount of shrinking of the continuous fiber tape 210 after cooling and releasing the continuous fiber tape 210 of the pre-stress. In this manner, when the polymer cools, and the pre-stress is removed from the continuous fiber tape 210, the resulting FRP composite 200 is substantially unwarped as shown in FIG. 2D.

In this manner, the FRP 200 (after molding and cooling) provides improvement of strength and stiffness while substantially eliminating the drawback of warping.

Figure 3A:
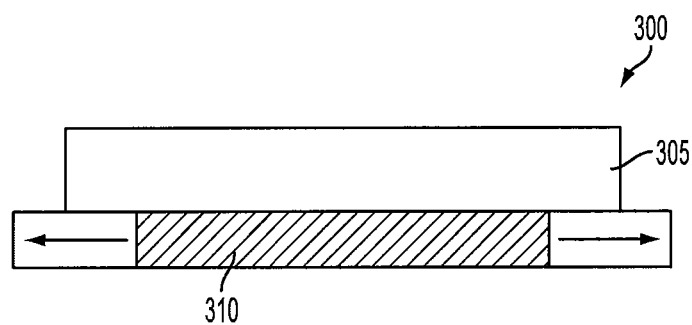
FIG. 3A illustrates another embodiment of a side, cross-sectional view of a polymer layer and the continuous fiber tape in a pre-stressed state in accordance with an embodiment of the present invention.
Figure 3B:
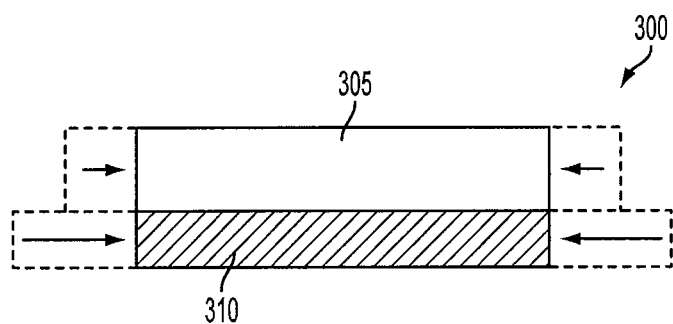
FIG. 3B illustrates the polymer layer and the continuous fiber tape of FIG. 3A after cooling in accordance with an embodiment of the present invention.

FIG. 3A and FIG. 3B illustrate another embodiment of a polymer 305 molded to a continuous fiber tape 310. However, as shown in FIG. 3A, the continuous fiber tape 310 may be pre-stressed to be dimensionally larger than the polymer 305 such that when the polymer 305 shrinks after cooling, and the pre-stress is removed from the continuous fiber tape 310, the FRP composite 300 is substantially unwarped.

Figure 4A:
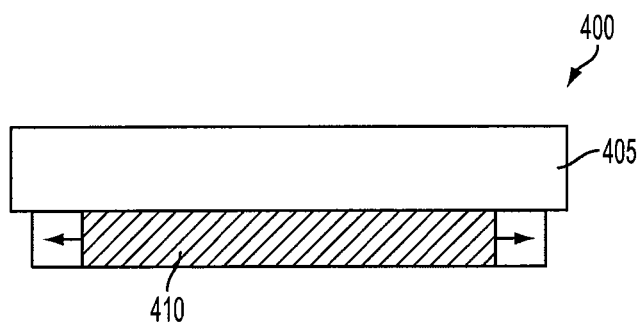
FIG. 4A illustrates another embodiment of a side, cross-sectional view of a polymer layer and the continuous fiber tape in accordance with an embodiment of the present invention.
Figure 4B:
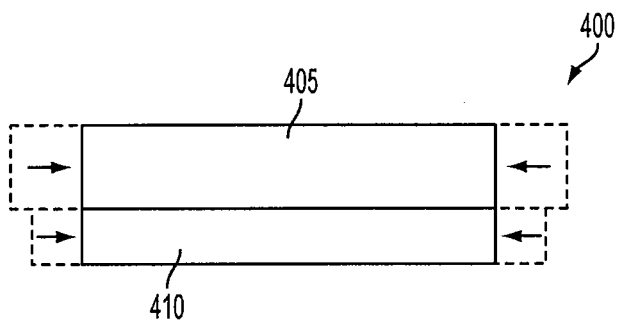
FIG. 4B illustrates the polymer layer and the continuous fiber tape of FIG. 4A after cooling in accordance with an embodiment of the present invention.

In another embodiment, FIG. 4A and FIG. 4B illustrate a polymer 405 molded to a continuous fiber tape 410. As shown in FIG. 4A, the continuous fiber tape 410, even after being pre-stressed and stretched, it may still be dimensionally smaller than the polymer 405 to result in a substantially unwarped FRP composite 400 when the polymer 405 shrinks after cooling, and the pre-stress is removed from the continuous fiber tape 410.

Figure 5:
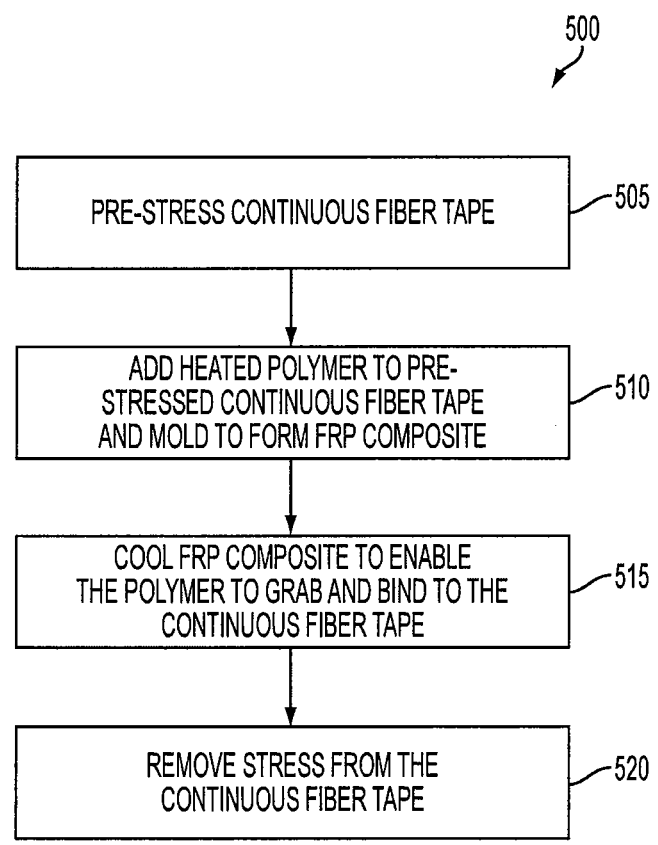
FIG. 5 illustrates a flow chart depicting a method of reducing warpage in molded polymers with continuous fiber tapes in accordance with an embodiment of the present invention.

FIG. 5 illustrates a flow chart 500 of a method of manufacturing a substantially unwarped FRP composite.

At step 505, the continuous fiber tape may be pre-stressed by, for example, stretching and holding the continuous fiber tape horizontally and/or vertically by means of a mechanical device such as a clamp. As the coefficient of linear expansion for the polymer and the continuous fiber tape is known (and therefore, also known is how much the polymer and/or the continuous fiber tape will shrink after cooling), as is the shape of the polymer, the amount of pre-stressing applied may be designed to match (or counteract) the dimensional difference between the polymer and the continuous fiber tape after cooling occurs.

At step 510, the heated and/or melted polymer may be added to the continuous fiber tape and molded in a desired shape. In other words, the continuous fiber tapes are pre-stressed, heated and mixed in with the polymer matrix.

At step 515, the molded FRP composite may be allowed to cool, and it is during this cooling process that the polymer grabs and binds to the continuous fiber tape such that after cooling, the molded FRP composite is substantially integrated and unwarped.

At step 520, during the cooling process, the pre-stress applied to the continuous fiber tape may be removed so that the continuous fiber tape may be allowed to shrink with the polymer to result in the molded FRP composite being substantially unwarped.

In one embodiment, the release of the pre-stress applied to the continuous fiber tape may be triggered by the cooling of the molded FRP composite (i.e., once the temperature of the molded FRP composite falls below a predetermined threshold, the pre-stress applied may be removed or released).

Examples of different polymers that may be used include polypropylene, thermosets resins (such as polyester, isopolyester, epoxy, phenolic), and thermoplastics among other different polymer compounds. Examples of continuous fiber tapes may include glass fiber tapes, carbon fiber tapes, aramid, among other different types of fiber tapes and/or reinforcing materials. Any combination of polymers and/or continuous fiber tapes is well within the spirit and scope of the invention and may be combined to result in a FRP composite.

Optionally, inorganic fillers including calcium carbonate, kaolin (hydrous aluminum silicate), alumina trihydrate, calcium sulfate, among other fillers may be used. By including filler, the cost of the FRP may be further reduced and the performance thereof may be increased (e.g., improving dimensional control, water resistance, weathering, surface smoothness, stiffness, among other advantages). However, a filled continuous fiber might not shrink as much an unfilled resin and further modifications to the pre-stress applied may be advantageous to ensure the prevention of warping.

Further optionally, additives and modifiers (such as catalysts, promoters, inhibitors, colorants, release agents, thixotropic agents, among other additives and modifiers) may be used in the FRP composite to modify material properties and to provide additional advantages including but not limited to processability or durability.

Certain embodiments have been disclosed to clarify the concepts including the above structural configurations. However, one skilled in the art will recognize that a number of different implementations may be performed with the concepts herein.

Unless otherwise indicated, all numbers expressing quantities of ingredients, volumes of fluids, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

The terms "a," "an," "the" and similar referents used in the context of describing the invention (especially in the context of the following claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Certain embodiments of this invention are described herein, including the best mode known to the inventors for carrying out the invention. Of course, variations on these described embodiments will become apparent to those of ordinary skill in the art upon reading the foregoing description. The inventor expects skilled artisans to employ such variations as appropriate, and the inventors intend for the invention to be practiced otherwise than specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

Furthermore, certain references have been made to patents and printed publications throughout this specification. Each of the above-cited references and printed publications are individually incorporated herein by reference in their entirety.

Specific embodiments disclosed herein may be further limited in the claims using consisting of or and consisting essentially of language. When used in the claims, whether as filed or added per amendment, the transition term "consisting of" excludes any element, step, or ingredient not specified in the claims. The transition term "consisting essentially of" limits the scope of a claim to the specified materials or steps and those that do not materially affect the basic and novel characteristic(s). Embodiments of the invention so claimed are inherently or expressly described and enabled herein.

In closing, it is to be understood that the embodiments of the invention disclosed herein are illustrative of the principles of the present invention. Other modifications that may be employed are within the scope of the invention. Thus, by way of example, but not of limitation, alternative configurations of the present invention may be utilized in accordance with the teachings herein. Accordingly, the present invention is not limited to that precisely as shown and described.

What is claimed is:

1. A method for reducing the warping of a molded polymer-continuous fiber compound, the method comprising:
   determining a first amount of shrinking of a layer of continuous fiber in response to cooling, the first amount of shrinking being greater than zero;
   determining a second amount of shrinking of a layer of polymer in response to cooling, the second amount of shrinking being greater than zero;
   determining a pre-stress amount that causes the layer of continuous fiber to be dimensionally smaller than the layer of polymer when the layer of continuous fiber is pre-stressed by the pre-stress amount and that is based on a difference between the first amount of shrinking and the second amount of shrinking;
   pre-stressing the layer of continuous fiber by approximately the pre-stress amount such that the layer of continuous fiber pre-stressed is dimensionally smaller than the layer of polymer;

heating the layer of polymer;
molding the layer of polymer heated to the layer of continuous fiber pre-stressed;
cooling the layer of continuous fiber pre-stressed and the layer of polymer heated; and
releasing the pre-stress of the layer of continuous fiber pre-stressed that is dimensionally smaller than the layer of polymer when from the pre-stress applied or after a temperature of the molded polymer-continuous fiber compound is at or below a predetermined threshold temperature value such that the layer of continuous fiber shrinks along with the layer of polymer to cause the molded polymer continuous fiber compound to be substantially flat.

2. The method of claim 1, wherein pre-stressing the layer of continuous fiber includes pre-stressing the layer of continuous fiber in two dimensions.

3. The method of claim 1, further comprising determining a degree of pre-stressing based on a coefficient of a linear expansion of a material of the continuous fiber layer of and a coefficient of a linear expansion of a material of the polymer layer of.

4. The method of claim 1, further comprising adding an inorganic filler or a modifier to at least one of the layer of continuous fiber or the layer of polymer.

5. A method of reducing the warping of a molded glass-reinforced polymer, the method comprising:
determining a dimensional difference between a continuous glass fiber tape and a polymer after cooling from a first temperature to a second temperature, based on a coefficient of linear expansion of the continuous glass fiber tape and a coefficient of linear expansion of the polymer;
determining a pre-stress amount that causes the continuous glass fiber tape to be dimensionally smaller than the polymer when the continuous glass fiber tape is pre-stressed by the pre-stress amount;
pre-stressing the continuous glass fiber tape by approximately the pre-stress amount by stretching and holding the continuous glass fiber tape at least one of horizontally or vertically by means of a device so that the continuous glass fiber tape is dimensionally smaller than the polymer;
heating the polymer;
adding the heated polymer to the pre-stressed continuous glass fiber tape to form a fiber-reinforced-polymer (FRP) composite;
molding the FRP composite;
cooling the FRP composite; and
releasing the continuous glass fiber tape pre-stressed that is dimensionally smaller than the polymer from the pre-stress applied when or after a temperature of the FRP composite is at or below a predetermined threshold temperature value such that the continuous glass fiber tape shrinks along with the polymer to cause the FRP composite to be substantially unwarped.

6. The method of claim 5, further comprising determining the pre-stress amount based on a coefficient of a linear expansion of a material of the continuous glass fiber tape and a coefficient of a linear expansion of a material of the polymer.

7. The method of claim 5, further comprising adding an inorganic filler or a modifier to the continuous glass fiber tape or the polymer.

8. The method of claim 4, wherein at least one of determining the first amount of shrinking or determining the second amount of shrinking is based on properties of the inorganic filler or the modifier.

9. The method of claim 7, wherein determining the dimensional difference between the continuous glass fiber tape and the polymer is further based on properties of the inorganic filler or the modifier.

10. The method of claim 5, wherein pre-stressing the continuous glass fiber tape includes stretching and holding the continuous glass fiber tape horizontally and vertically.

\* \* \* \* \*